United States Patent
Goris et al.

(10) Patent No.: US 7,755,678 B2
(45) Date of Patent: Jul. 13, 2010

(54) PROGRAMMABLE ANTI-ALIASING SYSTEMS AND METHODS FOR CAMERAS

(75) Inventors: Andrew C. Goris, Loveland, CO (US); Donald J. Stavely, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1079 days.

(21) Appl. No.: 11/261,275

(22) Filed: Oct. 28, 2005

(65) Prior Publication Data

US 2007/0097232 A1 May 3, 2007

(51) Int. Cl.
*H04N 5/262* (2006.01)
*H04N 5/228* (2006.01)
*G06K 9/40* (2006.01)

(52) U.S. Cl. ............... 348/239; 348/208.99; 348/208.4; 348/208.13; 382/269

(58) Field of Classification Search ............... 348/208.2, 348/208.6, 335, 208.99, 208.4, 208.13, 208.5, 348/0.2, 208.7, 187, 239; 345/611, FOR. 156, 345/136; 382/269, 254, 255, 264

See application file for complete search history.

(56) References Cited

U.S. PATENT DOCUMENTS

| | | | | |
|---|---|---|---|---|
| 6,122,447 | A * | 9/2000 | Washisu | 396/55 |
| 6,194,695 | B1 * | 2/2001 | Barrows | 250/208.1 |
| 6,297,913 | B1 * | 10/2001 | Hasenauer et al. | 359/691 |
| 6,326,998 | B1 * | 12/2001 | Palum | 348/342 |
| 6,486,910 | B1 * | 11/2002 | Kaneda et al. | 348/208.99 |
| 6,801,250 | B1 * | 10/2004 | Miyashita | 348/220.1 |
| 6,868,190 | B1 * | 3/2005 | Morton | 382/278 |
| 6,900,831 | B2 * | 5/2005 | Nishiwaki | 348/208.5 |
| 6,930,708 | B1 * | 8/2005 | Sato et al. | 348/208.99 |
| 6,987,530 | B2 * | 1/2006 | McConica | 348/208.6 |
| 7,167,596 | B2 * | 1/2007 | Yamamoto | 382/269 |
| 7,167,600 | B2 * | 1/2007 | Yamamoto | 382/284 |
| 7,212,215 | B2 * | 5/2007 | Sasaki et | 345/611 |
| 7,253,820 | B2 * | 8/2007 | Dawson | 345/611 |
| 7,385,632 | B2 * | 6/2008 | Shinohara et al. | 348/208.5 |
| 7,408,559 | B2 * | 8/2008 | Keshet | 345/611 |
| 7,460,132 | B2 * | 12/2008 | Kempf | 345/611 |
| 7,515,191 | B2 * | 4/2009 | Tanaka | 348/333.04 |
| 2003/0210251 | A1 * | 11/2003 | Brown | 345/611 |
| 2003/0214512 | A1 * | 11/2003 | Cheng | 345/611 |
| 2004/0113921 | A1 * | 6/2004 | Hains et al. | 345/611 |
| 2005/0030409 | A1 * | 2/2005 | Matherson et al. | 348/345 |
| 2005/0093883 | A1 * | 5/2005 | Lewis | 345/611 |
| 2005/0248661 | A1 * | 11/2005 | Stanvely et al. | 348/208.99 |
| 2007/0071346 | A1 * | 3/2007 | Li et al. | 382/254 |
| 2008/0037970 | A1 * | 2/2008 | Saito et al. | 396/55 |

FOREIGN PATENT DOCUMENTS

| | | |
|---|---|---|
| JP | 2002072048 | 3/2002 |
| JP | 2002072282 | 3/2002 |
| JP | 2002298154 | 10/2002 |
| JP | 2003125281 | 4/2003 |

\* cited by examiner

*Primary Examiner*—Tuan Ho
*Assistant Examiner*—Marly Camargo

(57) ABSTRACT

Systems and methods for implementing programmable anti-aliasing in cameras are disclosed. In an exemplary embodiment the method may comprise characterizing at least one image for existing aliasing, and characterizing existing blur in the at least one image. The method may also include introducing blur during image capture operations by the camera based on the aliasing and existing blur in the at least one image.

18 Claims, 4 Drawing Sheets

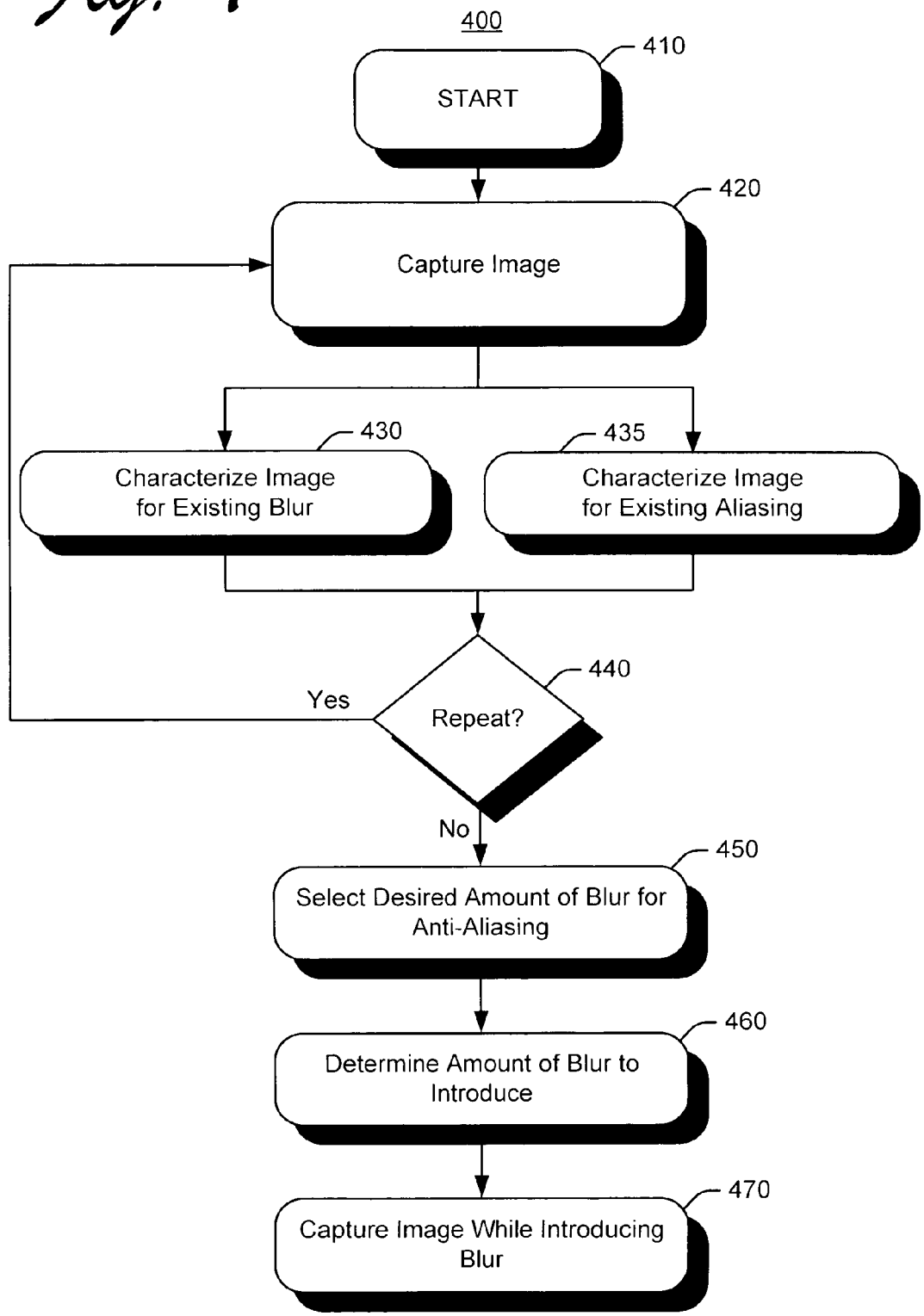

US 7,755,678 B2

PROGRAMMABLE ANTI-ALIASING SYSTEMS AND METHODS FOR CAMERAS

TECHNICAL FIELD

The described subject matter relates to cameras in general and more particularly to programmable anti-aliasing systems and methods for cameras.

BACKGROUND

Conventional film and more recently, digital cameras, are widely commercially available, ranging both in price and in operation from sophisticated single lens reflex (SLR) cameras used by professional photographers to inexpensive "point-and-shoot" cameras that nearly anyone can use with relative ease. Unlike conventional film cameras, however, digital cameras include image capture electronics that convert light (or photons) into electrical charge. The electrical charge accumulated on each photo-cell (or pixel) is read out and used to generate a digital image of the scene being photographed.

Generally, the resolution of digital cameras is limited by the number of pixels. If the camera does not have enough pixels to represent smooth lines, individual lines may appear jagged (e.g., as "stair-steps") and/or the image as a whole may appear grainy. In addition, the color of individual pixels in areas of high-contrast and/or fine detail may be erroneously represented as the primary colors registered by the individual pixels and appear as "color spots" in the photograph. These undesired effects are known in the digital photography arts as aliasing (and color aliasing).

Cameras are also available with anti-aliasing filters. Anti-aliasing filters shift the light being exposed on the pixels to slightly "blur" the image and thereby reduce aliasing, e.g., by making jagged lines appear smooth or colors blend together. However, the degree of blur cannot be controlled by the user, and therefore may not provide the image sharpness the user desires for certain photographs. In addition, introducing more blur with the anti-aliasing filter may blur the image too much if the camera is moving or shaking.

SUMMARY

An exemplary embodiment of programmable anti-aliasing for cameras may be implemented as a system. The system may comprise anti-aliasing logic for characterizing at least one image at the camera. The system may also comprise an optical controller operatively associated with the anti-aliasing logic. The optical controller introduces varying degrees of blur during image capture operations by the camera based on the characterized image.

In another exemplary embodiment, programmable anti-aliasing for cameras may be implemented as a method, comprising: characterizing at least one image for existing aliasing, characterizing existing blur in the at least one image, and introducing blur during image capture operations by the camera based on the aliasing and existing blur in the at least one image.

BRIEF DESCRIPTION OF THE DRAWINGS

FIG. 4 is a flowchart illustrating exemplary operations which may implement programmable anti-aliasing for cameras.

DETAILED DESCRIPTION

Briefly, systems and methods of programmable anti-aliasing for cameras may be implemented to reduce the effects of aliasing, e.g., the prominence of jagged edges or color spots in digital images. The systems and methods described herein implement different degrees of anti-aliasing, e.g., based on movement of the camera, camera settings, and/or user preferences.

Exemplary systems may include anti-aliasing logic which characterizes existing blur using a pre-image and adjusts the amount of aliasing for a particular image. For example, anti-aliasing may be increased if the camera is being held relatively still, and reduced if the camera is "shaking" or otherwise moving.

Exemplary System

Figure 1:
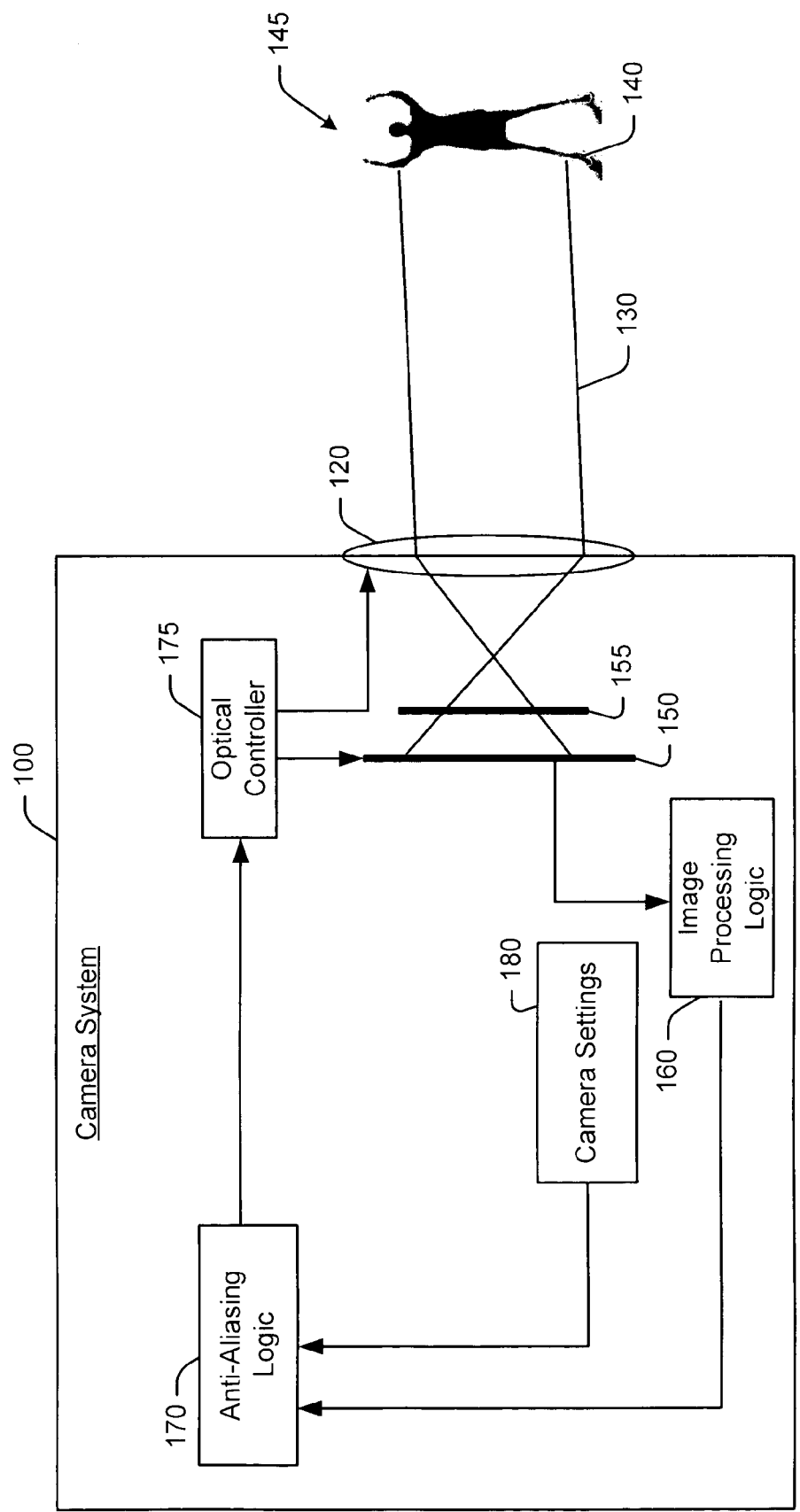
FIG. 1 is a high-level diagram of an exemplary camera system which may implement programmable anti-aliasing.

FIG. 1 is a high-level diagram of an exemplary camera system which may implement programmable anti-aliasing. Camera systems include digital still-photo and video cameras, now known or that may be later developed. Exemplary camera system 100 may be provided with logic for characterizing existing blur in a pre-image, and for adjusting the degree of anti-aliasing based on the existing blur and optionally other factors (e.g., camera settings and/or user preferences).

Exemplary camera system 100 may include a lens 120 positioned in the camera system 100 to focus light 130 reflected from one or more objects 140 in a scene 145 onto an image sensor 150 when a shutter 155 is open (e.g., for image exposure). Exemplary lens 150 may be any suitable lens which focuses light 130 reflected from the scene 125 onto image sensor 150.

Exemplary image sensor 150 may be implemented as a plurality of photosensitive cells, each of which builds-up or accumulates an electrical charge in response to exposure to light. The accumulated electrical charge for any given pixel is proportional to the intensity and duration of the light exposure. Exemplary image sensor 150 may include, but is not limited to, a charge-coupled device (CCD), or a complementary metal oxide semiconductor (CMOS) sensor.

Camera system 100 may also include image processing logic 160. In digital cameras, the image processing logic 160 receives electrical signals from the image sensor 150 representative of the light 130 captured by the image sensor 150 to generate a digital image of the scene 145.

Shutters, image sensors, and image processing logic, such as those illustrated in FIG. 1, are well-understood in the camera and photography arts. These components may be readily provided for camera system 100 by those having ordinary skill in the art after becoming familiar with the teachings herein, and therefore further description is not necessary.

Camera system 100 may also include anti-aliasing logic 170. Anti-aliasing logic 170 may be operatively associated with the image processing logic 160. During operation, anti-aliasing logic 170 receives one or more pre-image from the image processing logic, and uses the pre-image(s) to make a determination as to how much, if any, anti-aliasing to apply for an image based at least in part on existing blur and aliasing in the pre-images.

Using a pre-image enables the existing blur and aliasing to be determined independent of any knowledge about the lens quality, zoom, and/or aperture settings. The pre-image(s) may be one or more of the pre-images already being implemented by the camera for focusing, auto-exposure, pre-flash calculations, and/or pre-image(s) specifically for the purpose of determining the amount of existing blur. Although examples are discussed herein with reference to a pre-image, it is noted that anti-aliasing is not limited to use with pre-images. For example, images captured by the user may also be used.

In addition to characterizing the pre-images, other factors may also be considered for determining the amount of anti-aliasing. For example, anti-aliasing logic 170 may also receive input from a camera settings module 180. Camera settings module 180 may include factory-configured and/or user-configured settings for the camera system 100. For example, factory-configured settings may include pre-stored information about lens resolution (or blur) at different combinations of zoom settings, aperture settings, and focus settings. Other exemplary factors may include, but are not limited to, user preferences (e.g., the desired image sharpness), camera mode (e.g., flash-on), operational mode (e.g., focal length), and/or the scene being photographed (e.g., light levels).

If a determination is made to implement anti-aliasing for the image being photographed, anti-aliasing logic 170 may issue a signal to an optical controller 175. The signal "programs" the optical controller 175 such that the desired amount of blur is introduced during the image capture operations to achieve the desired anti-aliasing. In response, optical controller 175 may cause one or more optical element to move or shift during the image capture operation, thereby blurring the image.

By way of example, the programmable optical controller 175 may cause the lens 120, the image sensor 150, and/or other optical element(s) to move or shift during at least part of the exposure. The amount and time of movement or shifting will depend at least to some extent on design considerations, such as, e.g., which of the optical element(s) is/are being moved or shifted. For example, the amount of movement or shifting may be a fraction of a pixel or more for all or a portion of the exposure time, and is based on the amount of blur to be introduced.

Before continuing, it is noted that the camera system 100 shown and described above with reference to FIG. 1 is merely exemplary of a camera system which may implement programmable anti-aliasing. The systems and methods described herein are not intended to be limited only to use with the camera system 100. Other embodiments of cameras which may implement programmable anti-aliasing are also contemplated.

Figure 2:
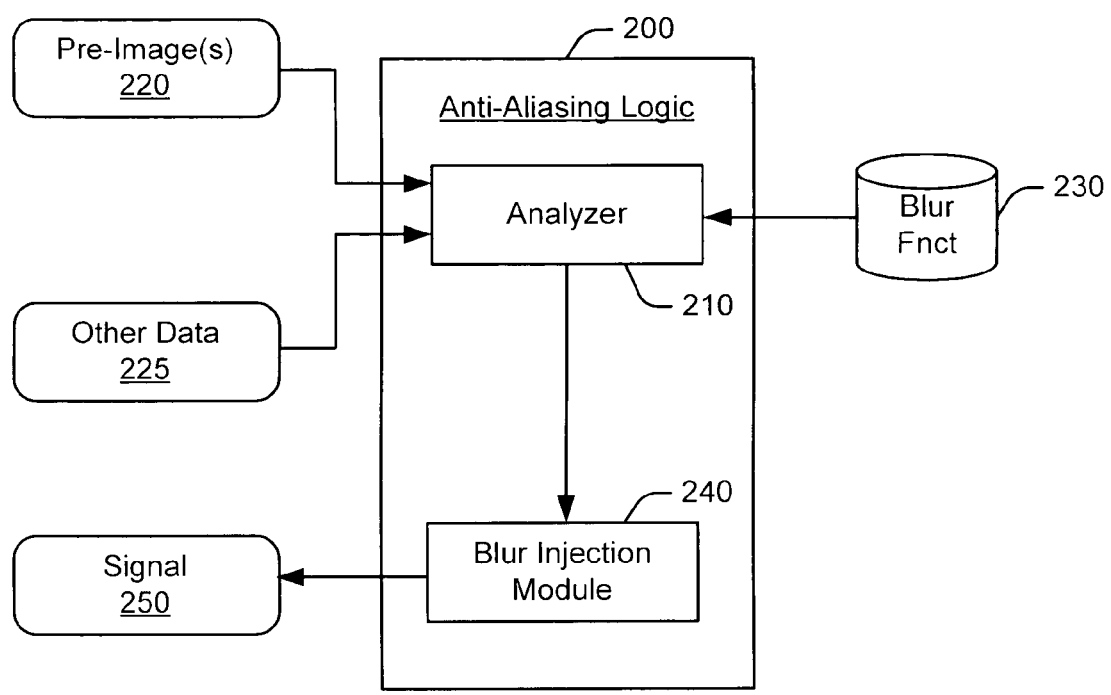
FIG. 2 is a functional block diagram of exemplary anti-aliasing logic which may be implemented for cameras.

FIG. 2 is a functional block diagram of exemplary anti-aliasing logic 200 which may be implemented for cameras (e.g., as the anti-aliasing logic 170 for camera system 100 shown in FIG. 1). Anti-aliasing logic 200 may be implemented to determine the amount, if any, blur that should be introduced during exposure of an image in order to achieve the desired anti-aliasing.

In an exemplary embodiment, anti-aliasing logic 200 includes a analyzer 210. Analyzer 210 receives one or more pre-image 220 (e.g., from the image processing logic 160 described above with reference to FIG. 1). Analyzer 210 may also receive other input 225, such as, but not limited to, factory-configured and/or user-configured camera settings, a user identity, and other information about the camera (e.g., focal length) and/or scene being photographed (e.g., ambient light levels).

The analyzer 210 analyzes the pre-image(s) 220, and optionally some or all of the other input 225, to characterize existing blur and aliasing. In an exemplary embodiment, the analyzer 210 may be implemented as a comparator. For example, if desired blur is Bd, and the un-modified expected blur is less than Bd, then the anti-aliasing logic 200 signals the optical controller to introduce enough blur to achieve Bd. If on the other hand, expected blur is greater than Bd, the anti-aliasing logic 200 disables the optical controller from inducing more blur. Alternatively, the analyzer may be implemented with a table (see, e.g., exemplary data in FIG. 3), where the table input is one or more of zoom, aperture, focus or other camera settings, and information from analysis of the pre-images, and the corresponding entry in the table is used to signal the optical controller to induce blur.

Techniques for characterizing expected blur from one or more images are well-understood. These techniques generally involve comparing at least one picture element (pixel) in a first image (or video frame) with at least one pixel in a second image (or video frame) to discern a change in the scene between the two frames. This process may be repeated for successive pairs of frames to characterize image blur relative to the background of the scene in approximately real time. As applied to still cameras, these techniques may be performed on pre-images, e.g., as obtained for the video preview mode, focus, auto-exposure, and/or specifically for anti-aliasing.

The comparison of pixels may be implemented in a variety of ways. For example, the magnitude of the pixel-by-pixel difference in brightness (luminance) may be computed. Alternatively, a pixel-by-pixel correlation (multiplication) may be performed. If the pixels compared are in corresponding locations in the two digital preview frames, an indication may be inferred that there is blur between the frames.

Techniques for characterizing an image for aliasing are also well-understood. For example, an image with little or no high-frequency information may exhibit little (if any) aliasing. On the other hand, if the pre-image includes many high frequency edges with high contrast, then the image may exhibit significant aliasing.

The pre-image(s) 220 may also be characterized for specific types of aliasing. For example, if there are near horizontal lines, there may be aliasing in the vertical direction, and blur may be introduced for anti-aliasing (e.g., by moving one or more optical element in the vertical direction). Likewise, if there are near vertical lines, there may be aliasing in the horizontal direction, and blur may be introduced for anti-aliasing (e.g., by moving one or more optical element in the horizontal direction). The pre-image may also be analyzed for color aliasing. For example, if the pre-image includes color spots, blur may be introduced for color anti-aliasing.

Analyzer 210 may also be implemented to determine how much blur (if any) should be introduced during the image capture operations for the desired anti-aliasing based on the characterized pre-image(s) 220. In an exemplary embodiment, analyzer 210 may access one or more blur functions 230 for making this determination. Blur functions 230 may be stored in a data store in long-term and/or short-term memory in the camera. An exemplary blur function is described in more detail below with reference to FIG. 3.

If the determination is made to introduce at least some blur during the image capture process, a blur injection module 240 issues one or more signals 250 to program the optical controller. The signal 250 may include the amount of blur to be introduced and/or how the blur should be introduced. For example, the signal 250 may indicate which optical element(s) should be moved or shifted, to what degree the optical element(s) should be moved or shifted, and/or start/stop/duration time for moving or shifting the optical element(s).

Other exemplary implementations of analyzing an image for anti-aliasing operations are known in the art. For example, co-owned U.S. patent application Ser. No. 10/637,956 filed on Aug. 8, 2003 of Matherson, et al. (Published on Feb. 10, 2005 as U.S. patent application Publication No. 2005/0030409) discloses methods and apparatus for generating data representative of an image and selecting a blur profile for anti-aliasing, and is hereby incorporated by reference for all that it discloses.

Figure 3:
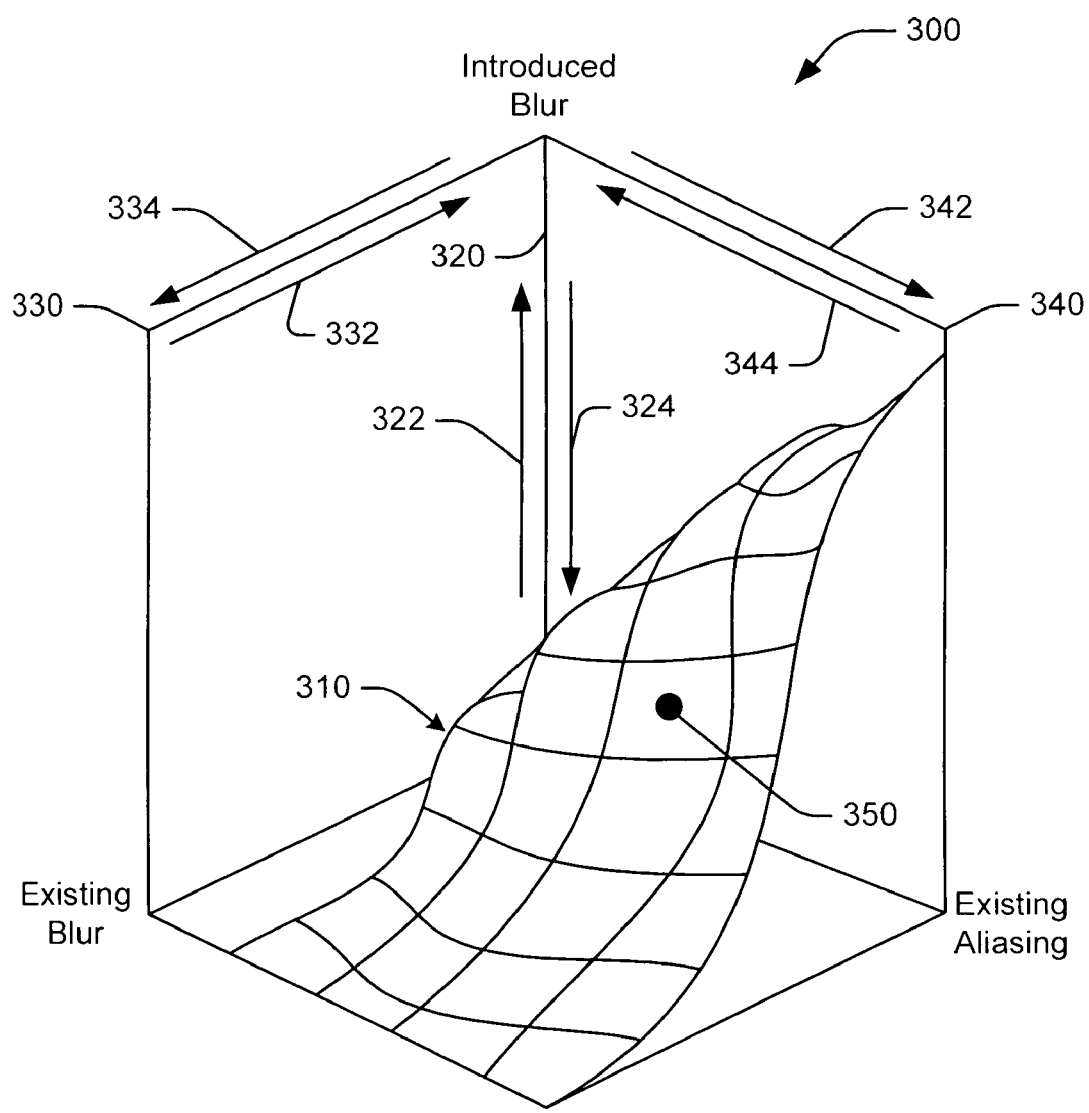
FIG. 3 is a three-dimensional plot of exemplary data which may be implemented for programmable anti-aliasing in cameras.

FIG. 3 is a three-dimensional plot 300 of exemplary data which may be implemented for programmable anti-aliasing in cameras. Plot 300 includes an exemplary blur function 310, i.e., the blur 320 to be introduced during image capture operations based on existing blur 330 and existing aliasing 340 in the pre-image(s).

The blur function 310 may be predetermined for any of a wide variety of different conditions (e.g., camera settings, ambient light in the scene, camera motion, etc.). In another embodiment, blur function 310 may be at least partly user-defined and/or adaptable, e.g., generated and/or modified based on actual use of the camera and/or user feedback.

Generally, however, it is observed from the plot 300 that the blur 320 to be introduced increases (arrow 322) as existing blur 330 decreases (arrow 332) and as existing aliasing 340 increases (arrow 342). Likewise, the blur 320 to be introduced decreases (arrow 324) as existing blur 330 increases (arrow 334) and as existing aliasing 340 decreases (arrow 344).

During operation, the blur function 310 may be implemented as follows to determine the amount of blur to introduce. The pre-image(s) are characterized for existing blur and existing aliasing. The intersection of these values is illustrated in plot 300 at point 350, and represents the blur 320 to introduce based on the blur function 310. Although illustrated graphically in FIG. 3, it is noted that the blur 320 to be introduced may be expressed as data for moving one or more optical element, such as, e.g., which optical element(s) to move, the frequency, and/or timing information for the movement.

Before continuing, it is noted that plot 300 is provided only for purposes of illustration and is not intended to be limiting. For example, the blur function 310 is not limited to a three-dimensional plot, and may instead be expressed as a mathematical equation (or other suitable model) and/or data in any suitable data structure(s). In addition, the example illustrated in FIG. 3 is based on analyzing image blur and aliasing in real-time, but it is noted that adaptive data analysis models may also be implemented which base the decision at least in part on other data (e.g., camera settings and/or user input).

Exemplary Operations

FIG. 4 is a flowchart illustrating exemplary operations which may implement programmable anti-aliasing for cameras. Operations 400 may be embodied as logic instructions on one or more computer-readable medium in the camera. When executed on a processor at the camera, the logic instructions implement the described operations. In an exemplary embodiment, the components and connections depicted in the figures may be used for programmable anti-aliasing.

The process starts in operation 410. For example, the process may start every time a user depresses the shutter button to the S1 position to obtain an image on the LCD prior to taking a picture of an image. Alternatively, the process may start after the image has been brought into focus. In still another example, the process may start only if one or more predetermined criteria have been satisfied (e.g., the anti-aliasing mode is selected by the user).

It is noted that the anti-aliasing process may also be deactivated automatically or manually by the user so that the process does not start in operation 410. For example, it may be desirable to deactivate anti-aliasing if the user is photographing a moving subject, or panning a scene. In an exemplary embodiment, the process may be automatically deactivated, e.g., based on motion detected during pre-exposure.

In operation 420, an image is captured. For example, a pre-image used to focus the camera on the scene may be used, or a separate image may be captured for the anti-aliasing process. In any event, the image is analyzed in operations 430 and 435.

In operation 430, the image is characterized for existing blur. For example, blur may be due to intentional camera movement or unintentional camera movement (e.g., shaking by the user). In operation 435, the image is characterized for existing aliasing. Different degrees of aliasing, including little or no aliasing, may exist in the image. For example, aliasing may due to the focal length of the camera. In addition, one or more type of aliasing may be introduced, such as, e.g., jagged lines and/or color spots.

In operation 440, a determination may be made to repeat operations 420-430/435. Additional images may be obtained in operation 420 and used to characterize blur (operation 430) and/or aliasing (operation 435) over time (e.g., using statistical models). If a determination is made not to repeat, or to stop repeating, operations may proceed.

In operation 450, the amount of blur is determined for the desired anti-aliasing. The amount of blur needed may be based on the degree of aliasing in the pre-image (e.g., as determined in operation 435), and may be independent of the amount of blur already present. In operation 460, the amount of blur to introduce during the image capture operations is determined. The amount of blur to introduce may be the same as, or less than, the amount of blur needed to achieve the desired anti-aliasing effect (e.g., as determined in operation 450). For example, the amount of blur to introduce during the image capture operations may be adjusted based on the amount of existing blur (e.g., as determined in operation 430).

In operation 470, the image is captured while introducing blur (e.g., as determined in operation 460). For example, blur may be introduced by issuing a control signal to program an optical controller to move or shift one or more optical element in the camera during image exposure. The control signal may identify which optical element(s) should be moved or shifted, to what extent the optical element(s) should be moved or shifted, and/or timing information for moving or shifting the optical element(s).

The operations shown and described herein are provided to illustrate exemplary embodiments of programmable anti-aliasing in cameras. It is noted that the operations are not limited to the ordering shown. For example, operations 430 and 435 may be implemented one before the other and/or simultaneously. In another example, operations 450 and 460 may be executed in reverse order or even simultaneously.

Still other operations may also be implemented. For example, operations may return from operation 450 and/or operation 460 to operation 420 to capture another pre-image if the previously captured images were not sufficiently characterized in operation 430 and/or operation 435. In addition, operations may terminate and/or restart at any point in time, e.g., if the user focuses the camera on a different scene, or if the characterizations in operations 430/435 have otherwise become invalid.

In addition to the specific embodiments explicitly set forth herein, other aspects and embodiments will be apparent to those skilled in the art from consideration of the specification disclosed herein. It is intended that the specification and illustrated embodiments be considered as examples only.

The invention claimed is:

1. A programmable anti-aliasing system for a camera, comprising:
   anti-aliasing logic for characterizing at least one image at the camera;
   an analyzer for the anti-aliasing logic, the analyzer comparing the at least one image with a blur function to determine the degree of blur to introduce during image capture operations; and
   an optical controller operatively associated with the anti-aliasing logic, the optical controller introducing varying degrees of blur during image capture operations by the camera based on the characterized image, wherein the varying degrees of blur is increased for more camera movement during image capture and decreased for less camera movement during image capture.

2. The system of claim 1 wherein the anti-aliasing logic characterizes existing blur in the at least one image.

3. The system of claim 1 wherein the anti-aliasing logic characterizes existing aliasing in the at least one image.

4. The system of claim 1 wherein the optical controller introduces blur by shifting at least one optical element in the camera during at least part of the image capture operation.

5. The system of claim 4 wherein the optical controller shifts the at least one optical element a predetermined amount of time in at least one direction based on the characterized image.

6. The system of claim 1 wherein the anti-aliasing logic characterizes the at least one image for aliasing based in part on at least one of the following: camera settings, user-preferences, and a scene being photographed.

7. The system of claim 1 wherein the at least one image includes a pre-image.

8. A method of programmable anti-aliasing for a camera, comprising:
   characterizing at least one image for existing aliasing;
   characterizing existing blur in the at least one image;
   comparing the at least one image with a blur function to determine the degree of blur to introduce during the image capture operations; and
   introducing blur by moving at least one camera element during subsequent image exposure capture operations by the camera based on the existing aliasing and existing blur in the at least one image.

9. The method of claim 8 wherein introducing blur is by shifting at least one optical element in the camera during image exposure.

10. The method of claim 8 wherein introducing blur is by shifting at least one optical element in the camera for a predetermined amount of time.

11. The method of claim 8 wherein introducing blur is by shifting at least one optical element in the camera in at least one direction.

12. The method of claim 8 further comprising characterizing the at least one image for aliasing based in part on at least one of the following: camera settings, user-preferences, and a scene being photographed.

13. The method of claim 8 further comprising capturing the at least one image as a pre-image only for anti-aliasing.

14. The method of claim 8 further comprising capturing the at least one image as a pre-image for focus operations at the camera.

15. The method of claim 8 further comprising capturing the at least one image as a pre-image for auto-exposure operations at the camera.

16. A camera system comprising:
   means for characterizing existing aliasing and existing blur in at least one image;
   means for comparing the at least one image with a blur function to determine the degree of blur to introduce during the image capture operations; and
   means for introducing blur during image capture operations by the camera based on the characterized aliasing and blur in the at least one image.

17. The camera system of claim 16 further comprising means for capturing the at least one image as a pre-image.

18. The camera system of claim 16 further comprising means for determining an amount of blur for introducing during the image capture operations.

* * * * *